United States Patent [19]
Wahl et al.

[11] Patent Number: 5,063,903
[45] Date of Patent: Nov. 12, 1991

[54] METHOD AND ARRANGEMENT FOR CONTROLLING THE METERING OF FUEL IN AN INTERNAL COMBUSTION ENGINE

[75] Inventors: Josef Wahl, Stuttgart; Alf Löffler, Markgröningen-Talhausen; Hermann Grieshaber, Aichtal-Aich; Wilhelm Polach, Möglingen; Ewald Eblen; Joachim Tauscher, both of Stuttgart; Helmut Laufer, Gerlingen; Ulrich Flaig, Markgröningen; Johannes Locher, Stuttgart; Manfred Birk, Oberriexingen; Gerhard Engel, Stuttgart; Alfred Schmitt, Ditzingen, all of Fed. Rep. of Germany; Pierre Lauvin, Francheville, France; Fridolin Piwonka, Markgröningen, Fed. Rep. of Germany; Anton Karle, VS-Villingen, Fed. Rep. of Germany; Hermann Kull, Stuttgart, Fed. Rep. of Germany

[73] Assignee: Robert Bosch GmbH, Stuttgart, Fed. Rep. of Germany

[21] Appl. No.: 551,402

[22] Filed: Jul. 12, 1990

[30] Foreign Application Priority Data

Jul. 12, 1989 [DE] Fed. Rep. of Germany ....... 3922859

[51] Int. Cl.$^5$ ............................................ F02M 37/04
[52] U.S. Cl. ..................... 123/500; 123/506; 123/494; 73/119 A
[58] Field of Search ............... 123/494, 500, 506, 419, 123/436, 357, 458, 599, 617; 73/119 A, 119 R, 814

[56] References Cited

U.S. PATENT DOCUMENTS

| | | | |
|---|---|---|---|
| 3,465,739 | 9/1969 | Burson | 123/599 |
| 4,495,915 | 1/1985 | Shinoda | 123/500 |
| 4,586,656 | 5/1986 | Wich | 123/458 |
| 4,617,906 | 10/1986 | Hill | 123/617 |
| 4,619,233 | 10/1986 | Yamaguchi | 123/500 |
| 4,619,239 | 10/1986 | Wallenfang | 123/458 |
| 4,667,634 | 5/1987 | Matsumura | 123/357 |
| 4,714,068 | 12/1987 | Nagase | 123/506 |
| 4,748,447 | 5/1988 | Oshizawa | 73/119 A |
| 4,766,863 | 8/1988 | Fujimori | 123/500 |
| 4,766,865 | 8/1988 | Hartel | 123/476 |
| 4,848,298 | 7/1989 | Schleupen | 123/617 |

FOREIGN PATENT DOCUMENTS

| | | |
|---|---|---|
| 0128817 | 12/1984 | European Pat. Off. ............ 123/436 |
| 3043326 | 8/1981 | Fed. Rep. of Germany . |
| 3540811 | 5/1987 | Fed. Rep. of Germany . |
| 3642678 | 6/1988 | Fed. Rep. of Germany . |

Primary Examiner—Carl Stuart Miller
Assistant Examiner—Erick Solis
Attorney, Agent, or Firm—Walter Ottesen

[57] ABSTRACT

The invention relates to a method and arrangement for controlling the fuel metered to an engine and especially to a diesel engine. The engine includes a fuel pump drive by a shaft for which injection start and injection end is fixed by a corresponding control of the electromagnetically actuated valve. The drive pulses for pump-delivery start and pump-delivery end are generated in dependence upon the analog signal of an angle sensor.

8 Claims, 1 Drawing Sheet

METHOD AND ARRANGEMENT FOR CONTROLLING THE METERING OF FUEL IN AN INTERNAL COMBUSTION ENGINE

FIELD OF THE INVENTION

The invention relates to a method and an arrangement for controlling the fuel metered to an internal combustion engine such as a diesel engine having a pump driven by a shaft. Injection start and injection end is fixed by correspondingly driving an electromagnetically actuated valve.

BACKGROUND OF THE INVENTION

Such a method and arrangement is disclosed in published patent application DE 35 40 811. In this publication, arrangement and method for controlling the metering of fuel in an internal combustion engine is described. A fuel pump includes a pump piston guided in a pump cylinder and driven by the cam shaft as well as a pump work chamber communicating with the injection nozzle via a pressure channel. Fuel is supplied to the pump work chamber via an electromagnetic valve. An electronic control arrangement determines the drive pulses for the electromagnetic valve in dependence upon control pulses initiated by marks on the crank shaft and by counting pulses triggered by marks on the cam shaft. The metering is very imprecise since the marks on the cam shaft have a finite spacing. The pump-delivery start and the pump-delivery end takes place only in discrete time intervals which are defined by the spacing of the marks on the cam shaft. The metering precision is therefore dependent upon the spacing of the marks. However, these markings cannot be as small as desired and therefore an imprecise metering occurs perforce.

Published German patent application DE 36 42 678 discloses a measuring arrangement for rotation angles. This measuring arrangement supplies an analog output signal proportional to the rotation angle and an approximately linear interrelationship is present between rotation angle and output signal.

Summary of the Invention

It is an object of the invention to provide a method of the kind described above wherein the injection start and the injection end and therefore the quantity of fuel injected can be precisely controlled as desired.

The method of the invention is for controlling the metering of fuel in an internal combustion engine such as a diesel engine, the engine having a fuel pump actuated by a shaft of the engine and an electromagnetically actuated valve for controlling the metering of the fuel to the engine. The method includes the steps of: fixing the injection start and the injection end by correspondingly driving the electromagnetically actuated valve; and, generating control pulses for pump-delivery start and pump-delivery end in dependence upon an analog signal of the analog sensor.

With respect to the state of the art, the invention affords the advantage that the control of the pump-delivery start and the pump-delivery end can take place with substantially greater precision.

BRIEF DESCRIPTION OF THE DRAWINGS

The invention will now be described with reference to the drawings wherein:

FIG. 3a is a front elevation view, partially in section, of the sensor used in the arrangement of FIG. 1; and, FIG. 3b is a side elevation view, partially in section, of the sensor of FIG. 3a.

DESCRIPTION OF THE PREFERRED EMBODIMENTS OF THE INVENTION

Figure 1:
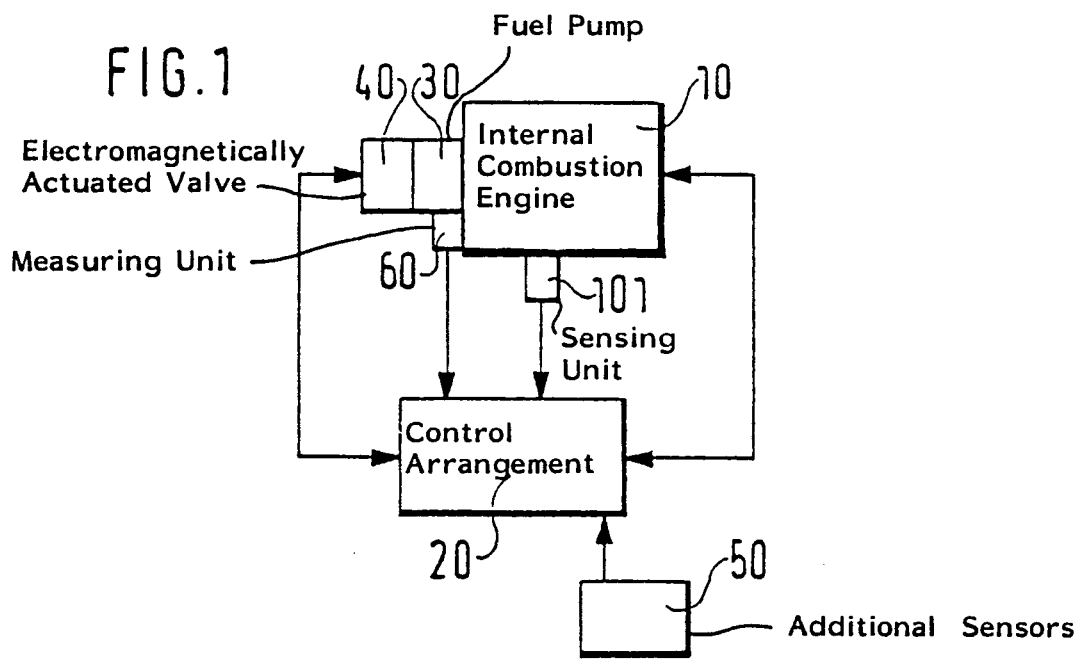
FIG. 1 is a block diagram showing an embodiment of an arrangement for metering fuel to an internal combustion engine.

As shown in FIG. 1, the internal combustion engine 10 is linked to a fuel-metering arrangement comprising an electromagnetically actuated valve 40 and a fuel pump 30. An electronic control arrangement 20 detects signals of a measuring unit 60 which recognizes the state of the fuel-metering device. The control arrangement 20 further detects the signals of a measuring unit 101 which, in turn, detects the operating characteristic variables of the engine and the control arrangement 20 also detects signals of additional sensors 50. In dependence upon these signals, the electronic control arrangement 20 generates signals for driving the fuel-metering device of the engine.

The fuel-metering device comprises at least an electromagnetically actuated valve and a fuel pump. The fuel-metering device meters fuel to the engine 10 at pump-delivery start computed by the electronic control arrangement 20 up to pump-delivery end. The fuel-metering device can be so configured that each cylinder is provided with an electromagnetic valve and a fuel pump. Another possibility is that only one electromagnetically actuated valve and one fuel pump 30 incorporating a distributing arrangement are provided for effecting the fuel supply. If the fuel-metering device comprises only one electromagnetic valve and one fuel pump, then this fuel-metering device meters fuel sequentially to the individual cylinders.

The fuel pump 30 comprises essentially a pump piston driven by a drive shaft as well as a pump work chamber communicating with the injection nozzle via a pressure channel. The fuel reaches the pump work chamber from a low pressure fuel source via an electromagnetic valve. The pump piston is driven by the movement of the drive shaft 110 and the pump piston places the fuel in the pump work chamber under pressure and delivers the same via the injection valve into the cylinder of the engine 10. The opening and closing times of the electromagnetically actuated valve 40 fix injection start and injection end. The injected fuel quantity is dependent upon the rotation angle of the drive shaft between the time point of injection start and the time point of injection end. The drive must be dependent upon the position of the drive shaft to obtain a precise fuel injection.

In conventional systems, markings are applied to the cam shaft or the crankshaft. Since these markings cannot be arranged as narrowly as desired, the precision of the fuel metering is limited by the spacing of these marks.

The electronic control arrangement 20 first computes the desired quantity of fuel to be injected and the desired injection start in dependence upon the operating characteristic variables of the engine such as rotational speed, temperature values, and the output signals of various sensors 50. The control arrangement 20 determines the drive pulses for the electromagnetically actuated valves in dependence upon the desired values for the quantity and the injection start as well as further variables such as the actual injection start, the reaction time of the electromagnetically actuated valves and possibly data stored in the control apparatus. The computation of the switch-on time point and the switch-off time point is not made in dependence upon the markings on the cam shaft or crankshaft; instead, they are computed in dependence upon an analog signal of an angle sensor 100 which characterizes the position of the drive shaft of the pump piston and therefore also the position of the pump piston.

Figure 2:
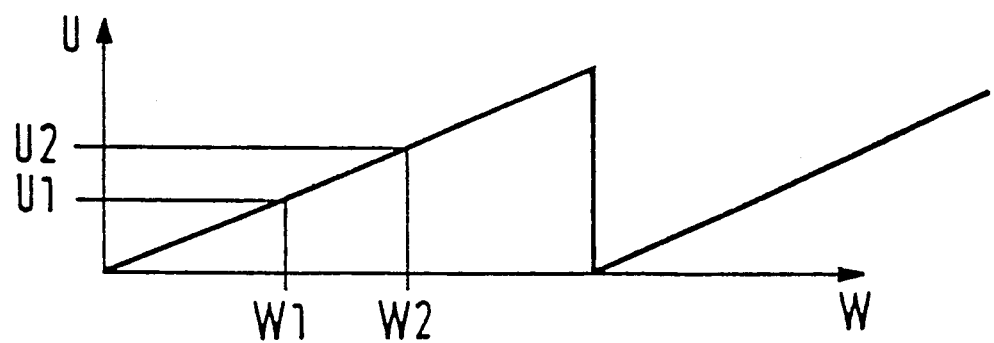
FIG. 2 is a waveform showing the interrelationship between the rotation angle and the output signal of the sensor.

FIG. 2 shows a possible interrelationship between the position of the drive shaft W and the output signal U of the measuring unit 60. In the angular range in which metering can occur, the output signal U of the measuring unit 60 increases as a function of the rotation angle W of the drive shaft and then drops again to the original value. If the electronic control arrangement 20 now computes a desired fuel delivery from the rotation angle W1 up to the rotation angle W2 of the cam shaft, then the control arrangement generates a drive pulse in the presence of an output signal U1 of the measuring unit and a decontrol pulse for the electromagnetically actuated valve in the presence of the measuring signal U2. The fuel metering then takes place when the output signal of the measuring unit lies between the values U1 and U2 which correspond to angles W1 and W2, respectively. In this way, the start and end can take place at any desired angular position and is not dependent upon the discrete markings. The metering takes place precisely between the desired pump-delivery start and the desired pump-delivery end. A precise metering takes place by assigning a voltage value to each position of the pump piston. In the simplest case, a linear relationship is present between the cam shaft angle and the measuring signal.

The measuring unit for detecting the rotation angle of the drive shaft can be mounted on the crankshaft, cam shaft or on the pump drive shaft. An especially advantageous configuration is obtained by providing a transducer for each cylinder on the particular drive shaft. In this way, torsion vibrations on the shaft can be compensated with pump-nozzle systems. The measuring unit 60 includes a transducer and an evaluation circuit.

Figure 3A:
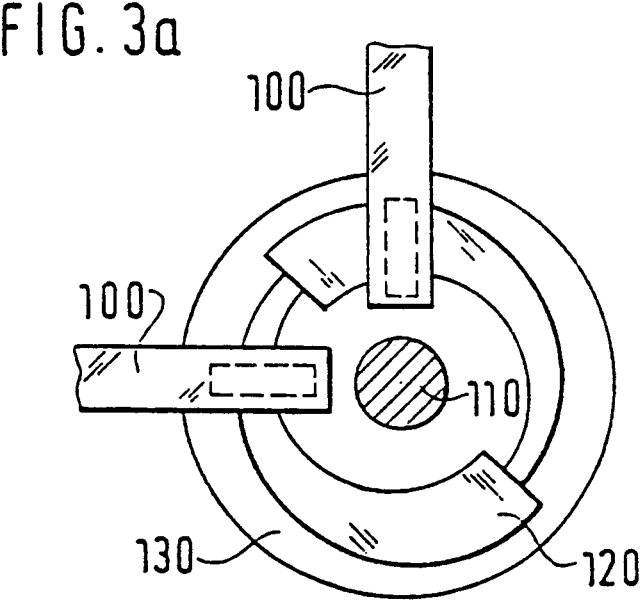
Figure 3B:
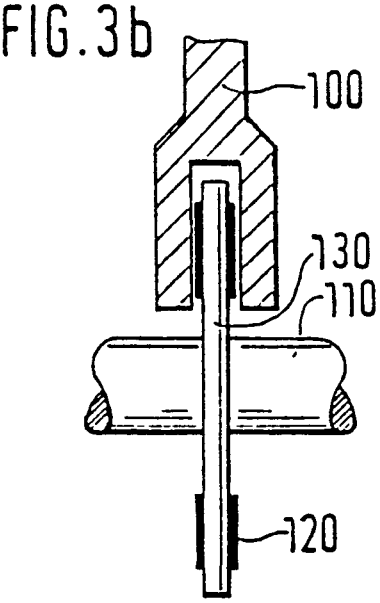

FIGS. 3a and 3b show an especially simple configuration of the transducer which is in the form of a so-called dragon transducer. A carrier disc 130 is mounted on the shaft 110 whose rotation angle is to be detected. A coating 120 is applied to the carrier disc 130 and has a width which can be varied in dependence upon angle. Different coating materials can be used in dependence upon the principle according to which the transducer operates. Different ways of operating are known for the transducer, for example, eddy current or Hall effect. For an eddy current transducer, a conductive material such as copper can be used. One or more sensors 100 then detect a signal which is dependent upon the width of the coating. The functional relationship between angle and measuring signal can be varied by the width of the coating in dependence upon rotation angle. Accordingly, and as shown in FIG. 2, a linear relationship between angle W and output signal U can be defined. The further evaluation is especially simple if a linear relationship exists between angle W and output signal U. An especially advantageous arrangement is one wherein the signal U increases greatly in an angular range wherein high precision is required and the signal U changes only slightly in an angular range in which reduced precision is required. This signal is then processed in the evaluation circuit and a voltage value is present at the output of this circuit or a current value U which is dependent upon the angular position. Such a measuring unit is disclosed, for example, in published German patent application DE 36 42 678.

It is understood that the foregoing description is that of the preferred embodiments of the invention and that various changes and modifications may be made thereto without departing from the spirit and scope of the invention as defined in the appended claims.

What is claimed is:

1. A system for controlling the metering of fuel to an internal combustion engine such as a diesel engine having a drive shaft for driving a pump, the system comprising:
   sensor means for providing sensor signals indicative of respective operating parameters of the engine;
   a fuel pump driven by the drive shaft;
   an electromagnetically actuated valve responsive to first and second drive pulses for fixing injection start and injection end, respectively;
   measuring means for detecting the angular position W of said drive shaft and for generating an analog signal U proportional to said angular position W;
   a control unit connected to said sensor means for receiving said sensor signals to provide voltage values U1 and U2 dependent upon said sensor signals with said voltage values U1 and U2 corresponding to respective angular positions W1 and W2 of said drive shaft; and,
   said control unit also being connected to said measuring means for receiving said analog signal U for emitting said first drive pulse when said analog signal U corresponds to U1 and said second drive pulse when said analog signal U corresponds to U2 whereby fuel is metered to the engine when said analog signal U lies between said voltage values U1 and U2.

2. The system of claim 1, wherein said measuring means comprises an angle sensor mounted on the crank shaft of the engine.

3. The system of claim 1, wherein said measuring means comprises an angle sensor mounted on the cam shaft or on the pump drive shaft.

4. The system of claim 1, wherein said measuring means comprises a transducer assigned to each cylinder of the engine.

5. A method for controlling the metering of fuel in an internal combustion engine such as a diesel engine, the engine having a fuel pump actuated by a drive shaft of the engine and an electromagnetically actuated valve for controlling the metering of the fuel to the engine, the valve being responsive to first and second drive pulses for fixing injection start and injection end, respectively, the method comprising the steps of:
   utilizing sensor means for providing sensor signals indicative of respective operating parameters of the engine;
   detecting the angular position W of the drive shaft and generating an analog signal U proportional to said angular position W;
   applying the sensor signals to a control unit to provide voltage values U1 and U2 dependent upon the sensor signals with said voltage values U1 and U2 corresponding to respective angular positions W1 and W2 of said drive shaft; and, applying said analog signal U to said control unit for emitting said first drive pulse when said analog signal U corresponds to U1 and said second drive pulse when said analog signal U corresponds to U2 whereby fuel is metered to the engine when said analog signal U lies between said voltage values U1 and U2.

6. The method of claim 5, wherein said analog signal characterizes the position of the pump piston.

7. The method of claim 6, wherein a linear relationship exists between rotation angle of the pump drive shaft and said analog signal.

8. The method of claim 6, wherein said analog signal increases more intensely in angular ranges wherein a high precision is required than in the remaining ranges.

* * * * *